(12) United States Patent
Sugiura (10) Patent No.: US 11,953,345 B2
(45) Date of Patent: Apr. 9, 2024

(54) SENSOR AND MOVEMENT GUIDE DEVICE INCLUDING THE SAME SENSOR

(71) Applicant: THK CO., LTD., Tokyo (JP)

(72) Inventor: Masashi Sugiura, Tokyo (JP)

(73) Assignee: THK CO., LTD., Tokyo (JP)

(*) Notice: Subject to any disclaimer, the term of this patent is extended or adjusted under 35 U.S.C. 154(b) by 186 days.

(21) Appl. No.: 17/787,798

(22) PCT Filed: Dec. 16, 2020

(86) PCT No.: PCT/JP2020/046931
§ 371 (c)(1),
(2) Date: Jun. 21, 2022

(87) PCT Pub. No.: WO2021/131955
PCT Pub. Date: Jul. 1, 2021

(65) Prior Publication Data
US 2023/0027835 A1 Jan. 26, 2023

(30) Foreign Application Priority Data
Dec. 26, 2019 (JP) .................. 2019-235847

(51) Int. Cl.
G01D 11/24 (2006.01)
(52) U.S. Cl.
CPC ................... *G01D 11/245* (2013.01)
(58) Field of Classification Search
CPC .................................... G01D 11/245
See application file for complete search history.

(56) References Cited

U.S. PATENT DOCUMENTS

2018/0331457 A1* 11/2018 De Renzis ........... H05K 7/1472
2020/0010287 A1* 1/2020 Urata .................... B65G 54/02

FOREIGN PATENT DOCUMENTS

| CN | 106104030 A | * 11/2016 | .............. F16C 29/00 |
| CN | 209673907 U | 11/2019 | |
| JP | 10-138065 A | 5/1998 | |
| JP | 2007-292678 A | 11/2007 | |
| JP | 2014-32806 A | 2/2014 | |
| JP | 2018-538652 A | 12/2018 | |

OTHER PUBLICATIONS

International Search Report dated Mar. 2, 2021, issued in counterpart International Application No. PCT/JP2020/046931. (2 pages).

* cited by examiner

Primary Examiner — Jamel E Williams
(74) Attorney, Agent, or Firm — WHDA, LLP (57) ABSTRACT

To provide a sensor that can be downsized in order to ensure a stroke of a moving member when the sensor is mounted on a track member, and a movement guide device including the sensor. A sensor that is attached to a movement guide device having a track member extending in a longitudinal direction and a moving member attached to the track member in such a manner that the moving member is movable in the longitudinal direction includes: a housing that houses a sensor substrate; a shielded cable connected to the sensor substrate; and a cable bushing that holds and secures the shielded cable to the housing. The cable bushing has a conduction hole that allows the housing and the shielded cable to be electrically connected to each other, and the housing has a conduction part that can be inserted into the conduction hole.

8 Claims, 6 Drawing Sheets

SENSOR AND MOVEMENT GUIDE DEVICE INCLUDING THE SAME SENSOR

TECHNICAL FIELD

The present invention relates to a sensor that is attached to a movement guide device including a track member and a moving member movable with respect to the track member, and the movement guide device including the sensor.

BACKGROUND ART

Conventionally, in order to monitor the status of a movement guide device, such as a linear movement guide device, for example, various sensors, such as a vibration sensor and a magnetic sensor, are attached to a track member or moving member of the linear movement guide device.

For example, in order to ensure waterproofness and dust-proofness and achieve downsizing at the same time, the sensor described in Patent Literature 1 is a sensor having a cable that extends inside and outside thereof and includes a plurality of core wires and a sheath surrounding the core wires, the sensor further having a housing made of metal, a cable installation channel in which the cable is installed, the cable installation channel being formed in the housing and positioned between a pair of mounting holes, and an insulating molded member mounted to the cable installation channel and having a through hole through the cable in the direction of cable extension, the cable having a non-covered part without the sheath in a part adjacent to the sensor, and the plurality of core wires in the non-covered part being arranged in the insulating molded member.

With such a sensor, since the plurality of core wires in the non-covered part exposed by removing the sheath of the cable is arranged in the cable installation channel, for example, the width of the cable installation channel can be smaller than the width (thickness) of the cable. Therefore, the distance between the pair of mounting holes is not restricted by the width (thickness) of the cable for installing the sensor on site, and can be narrower than the width (thickness) of the cable. This improves the degree of freedom when determining the size of the optical sensor, especially when downsizing the optical sensor.

CITATION LIST

Patent Literature

Patent Literature 1: Japanese Patent Laid-Open No. 2014-
DISCLOSURE OF THE INVENTION

Problems to be Solved by the Invention

Conventionally, when attaching a sensor to a movement guide device, the sensor is attached to a track member. A moving member moves along the track member, and therefore, the sensor is attached to one end of the track member in the longitudinal direction in order to ensure a stroke of the moving member.

Once such a sensor is attached to the movement guide device, the stroke decreases because of the sensor attached. Therefore, there is a demand for minimizing the size of the sensor to ensure a stroke of the moving member.

Figure 9:
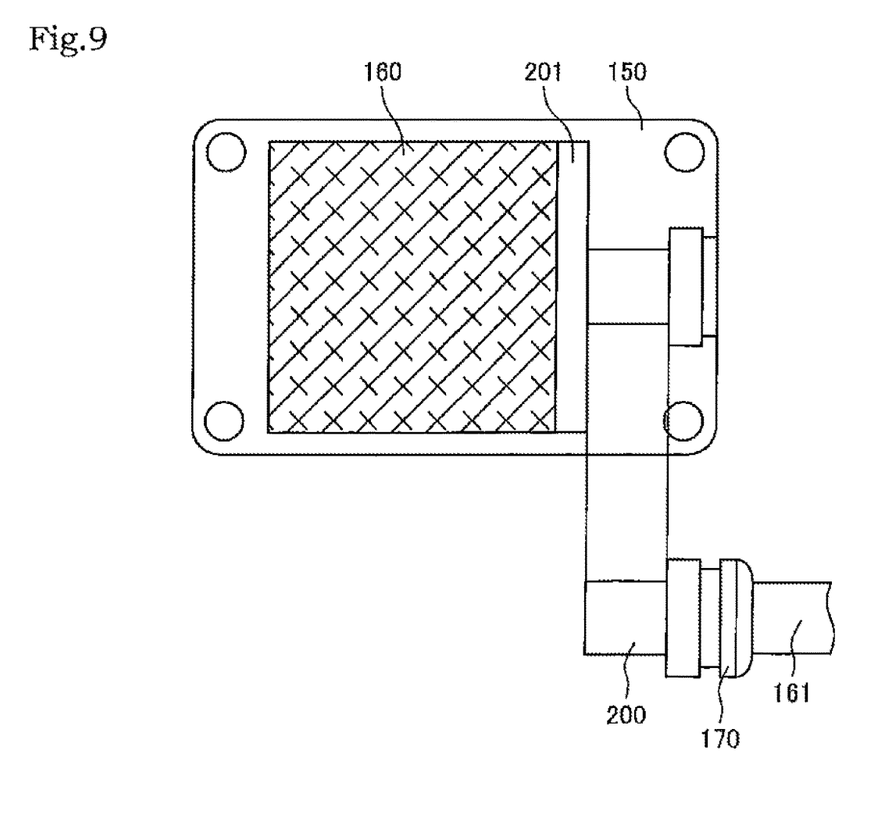
FIG. 9 is a schematic diagram for illustrating a structure of a conventional sensor.

However, with the structures of conventional sensors, as shown in FIG. 9, when connecting a shielded cable 161 to a sensor substrate 160 housed in a housing 150, a cable bushing 170 is attached to one end of the shielded cable 161, and an insulating area 201 is needed to insulate a shielded area, in which a shield part 200 in the shielded cable comes into contact with the housing 150, and the shield part 200 from the sensor substrate 160. Therefore, there is a problem that it is difficult to downsize the housing 150.

An object of the present invention, which has been devised to solve the problem described above, is to provide a sensor that can be downsized in order to ensure a stroke of a moving member when the sensor is mounted on a track member.

Means for Solving the Problems

A sensor according to the present invention that solves the problem described above is a sensor that is attached to a movement guide device having a track member extending in a longitudinal direction and a moving member attached to the track member in such a manner that the moving member is movable in the longitudinal direction includes: a housing that houses a sensor substrate; a shielded cable connected to the sensor substrate; and a cable bushing that holds and secures the shielded cable to the housing. The cable bushing has a conduction hole that allows the housing and the shielded cable to be electrically connected to each other, and the housing has a conduction part that can be inserted into the conduction hole.

Effects of the Invention

With the sensor according to the present invention, the conduction between the housing and the shielded cable can be achieved by the conduction holes formed in the cable bushing, and therefore, the length of the housing in the longitudinal direction can be reduced, and the sensor can be downsized.

MODE FOR CARRYING OUT THE INVENTION

In the following, a sensor according to an embodiment of the present invention will be described with reference to the drawings. The embodiment described below is not intended to limit the invention according to each claim, and all the combinations of the characteristics described in the embodiment are not necessarily essential for the solution according to the present invention.

Figure 1:
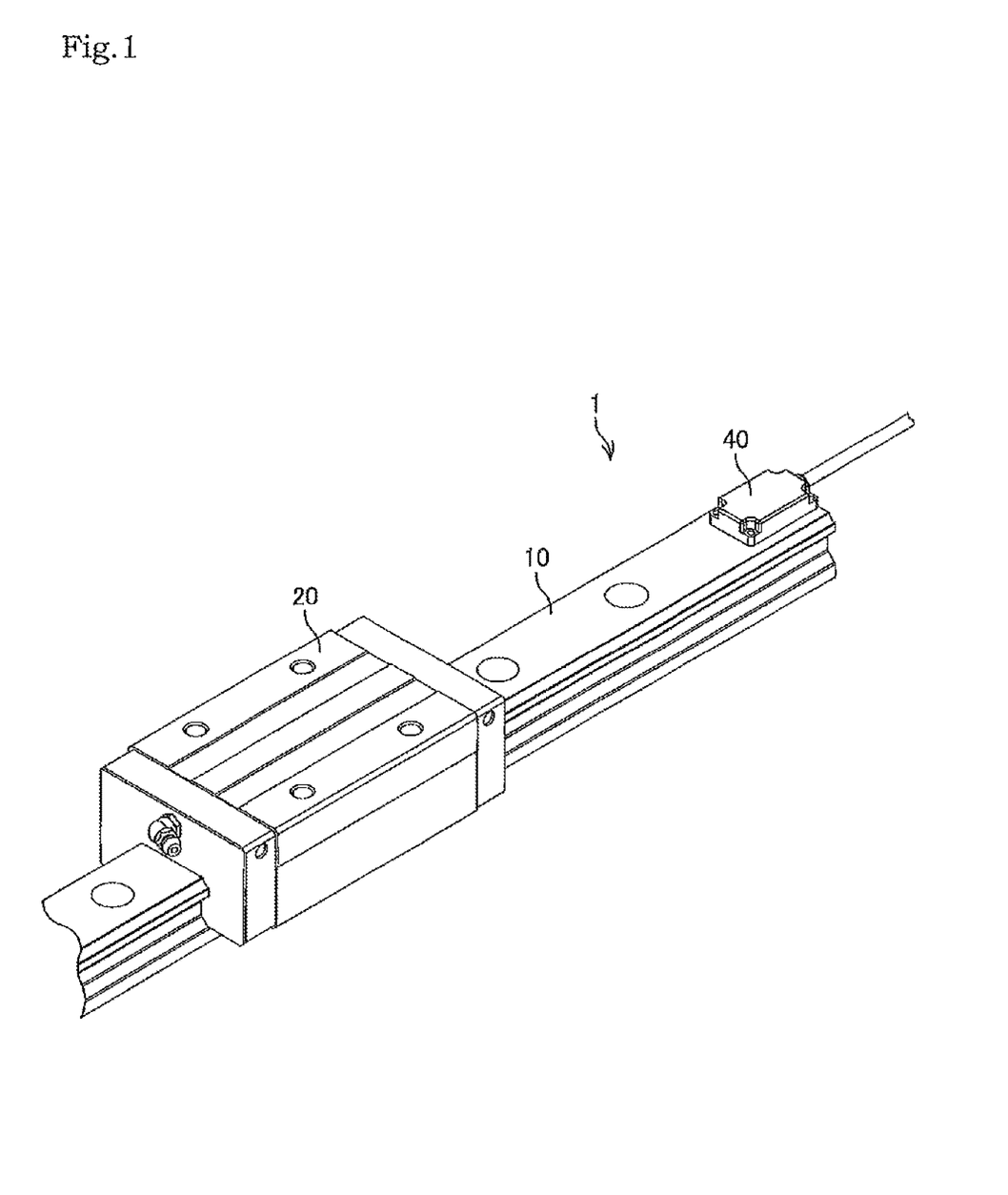
FIG. 1 is a perspective view of a movement guide device with a sensor according to an embodiment of the present invention attached thereto.
Figure 2:
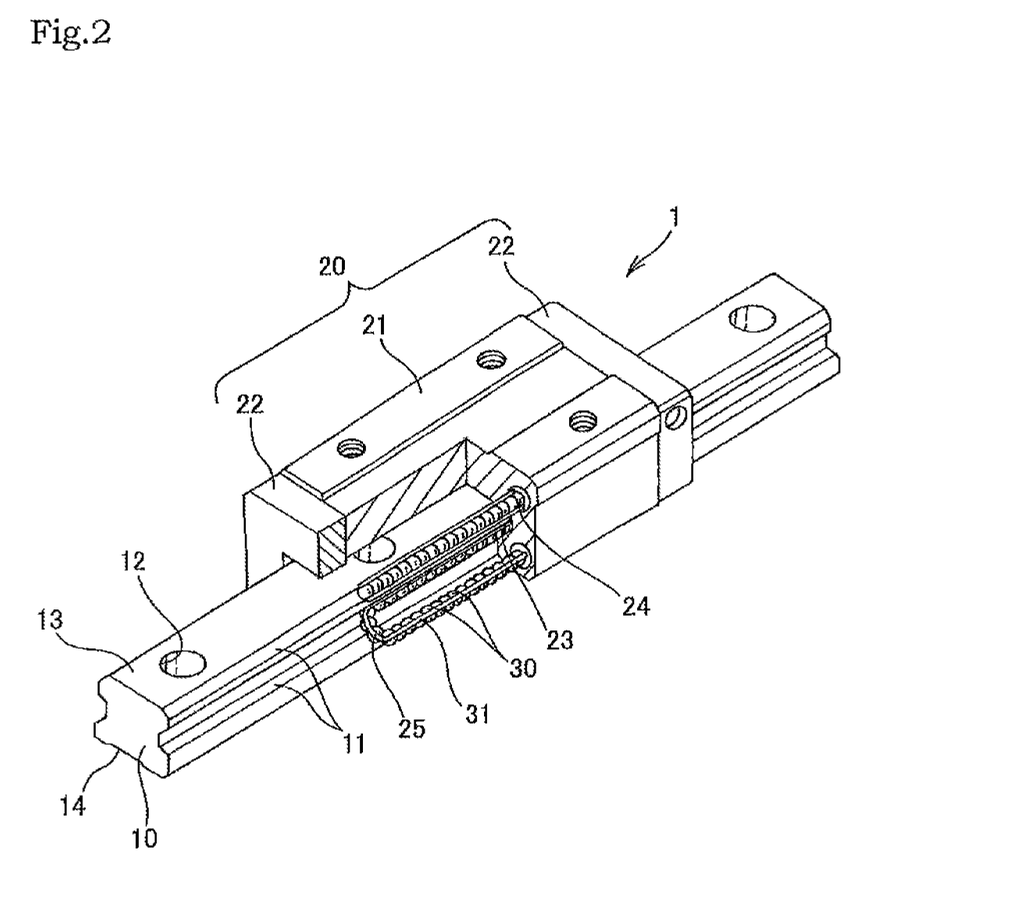
FIG. 2 is a partially cross-sectional view of the movement guide device with the sensor according to the embodiment of the present invention attached thereto.
Figure 3:
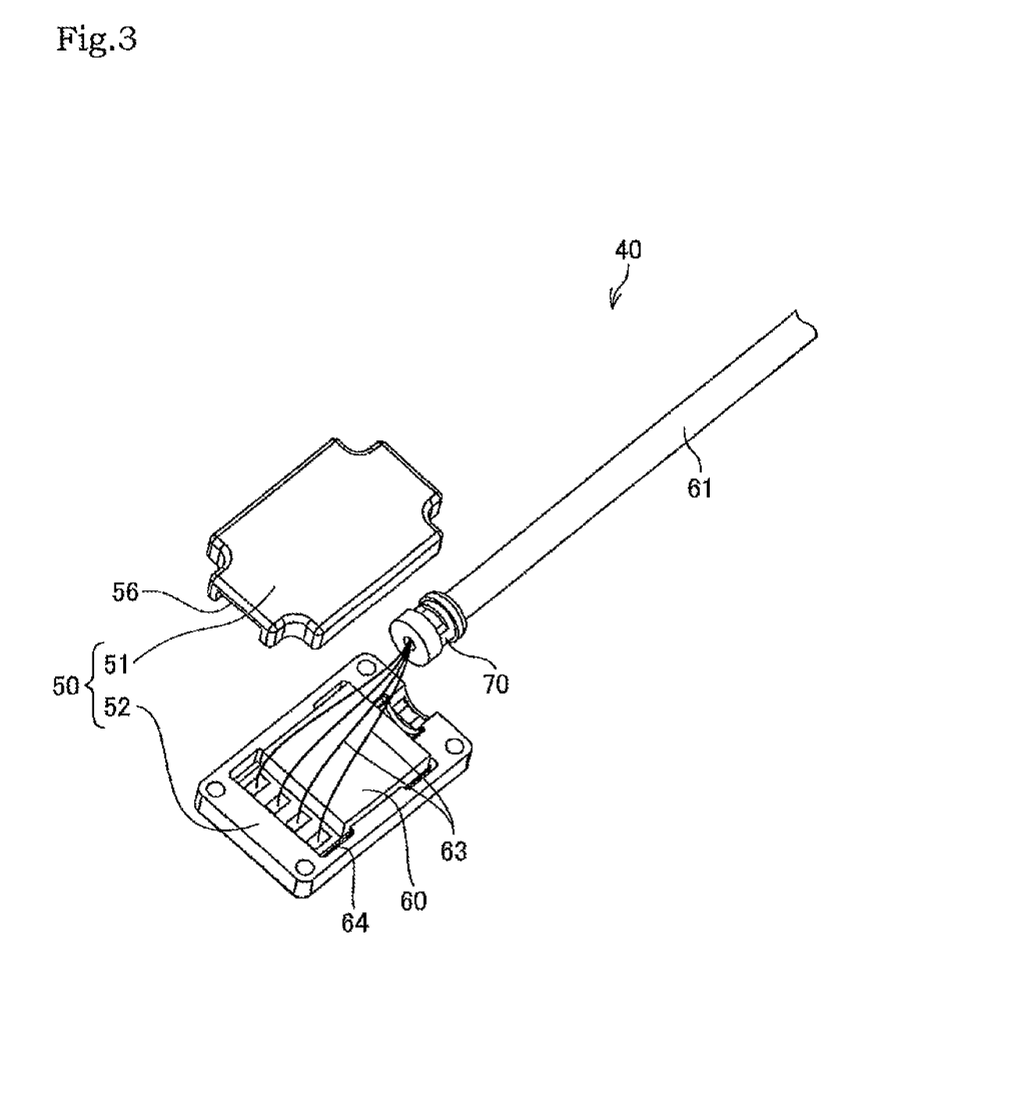
FIG. 3 is an exploded view for illustrating a structure of the sensor according to the embodiment of the present invention.
Figure 4:
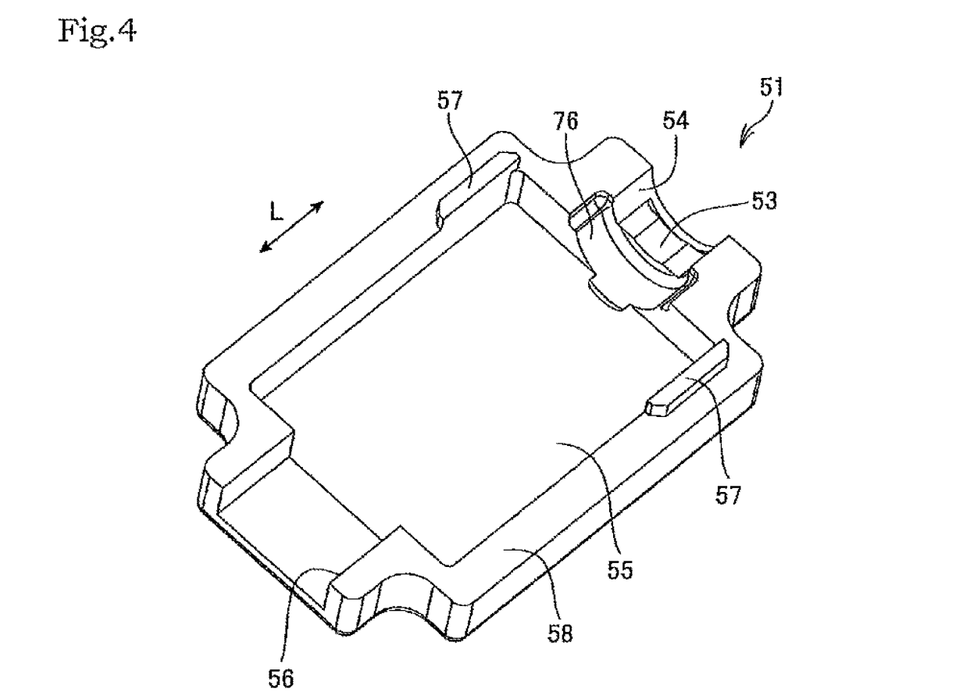
FIG. 4 is a perspective view of an upper case of the sensor according to the embodiment of the present invention.
Figure 5:
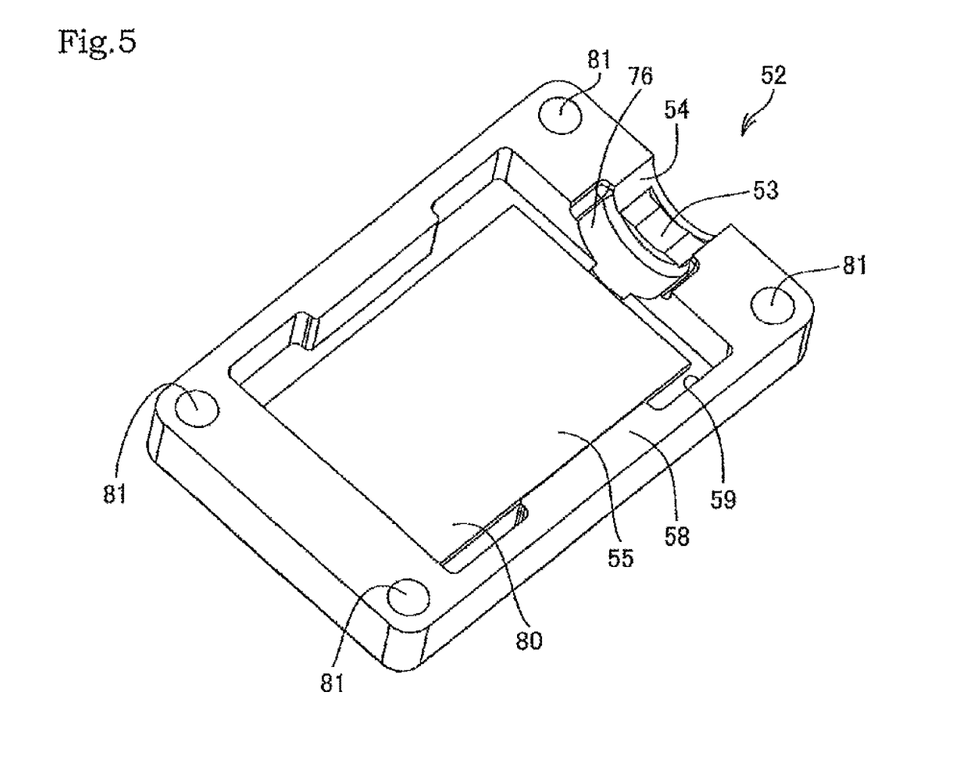
FIG. 5 is a perspective view of a lower case of the sensor according to the embodiment of the present invention.
Figure 6:
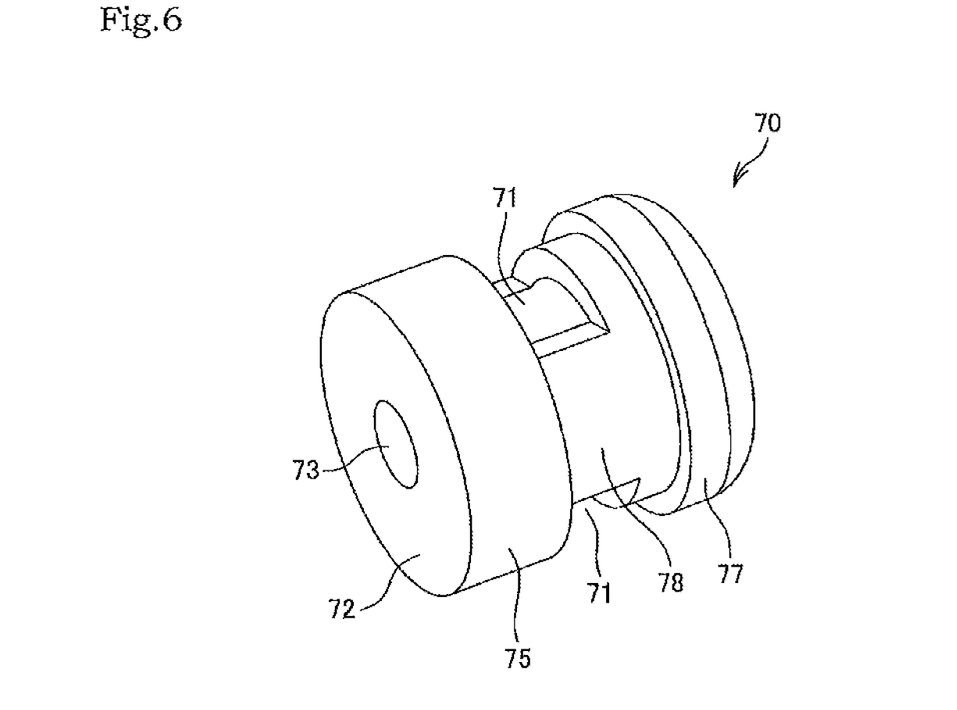
FIG. 6 is a perspective view of a cable bushing of the sensor according to the embodiment of the present invention showing a cable hole side thereof.
Figure 7:
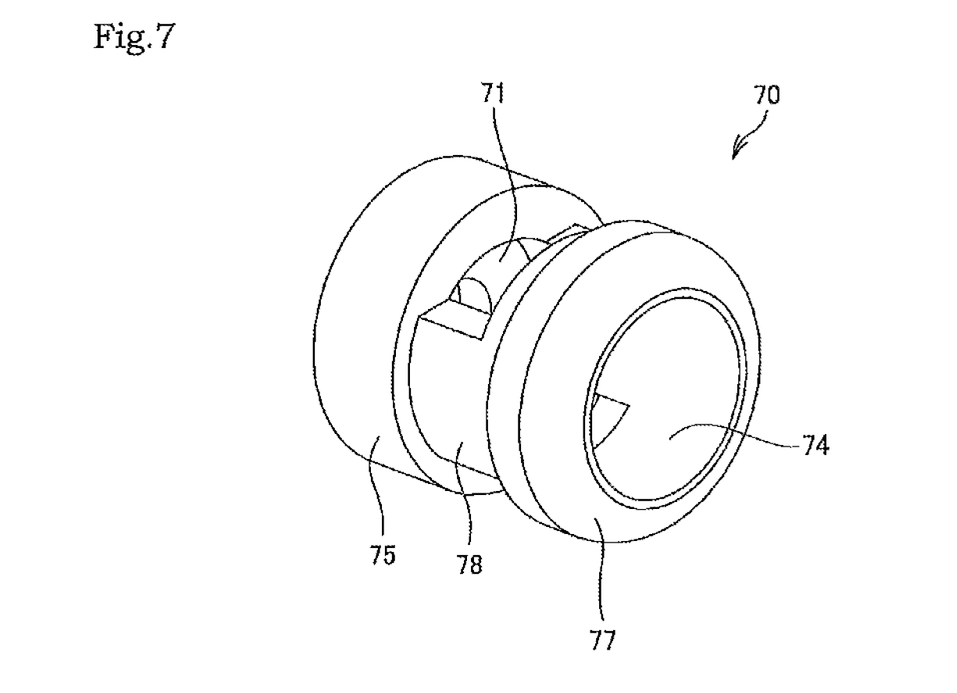
FIG. 7 is a perspective view of the cable bushing of the sensor according to the embodiment of the present invention showing a shielded cable insertion part side thereof.
Figure 8:
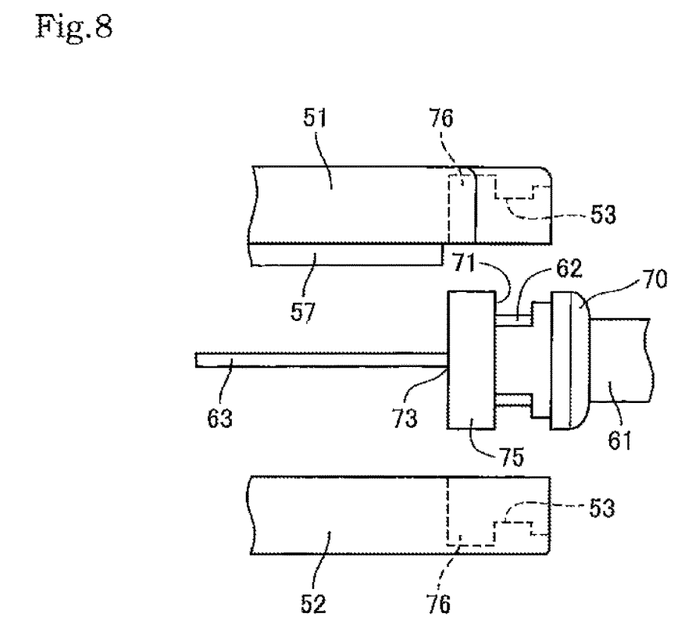
FIG. 8 is a schematic diagram for illustrating an attachment structure of the cable bushing of the sensor according to the embodiment of the present invention.

FIG. 1 is a perspective view of a movement guide device with a sensor according to an embodiment of the present invention attached thereto, FIG. 2 is a partially cross-sectional view of the movement guide device with the sensor according to the embodiment of the present invention attached thereto, FIG. 3 is an exploded view for illustrating a structure of the sensor according to the embodiment of the present invention, FIG. 4 is a perspective view of an upper case of the sensor according to the embodiment of the present invention, FIG. 5 is a perspective view of a lower case of the sensor according to the embodiment of the present invention, FIG. 6 is a perspective view of a cable bushing of the sensor according to the embodiment of the present invention showing a cable hole side thereof, FIG. 7 is a perspective view of the cable bushing of the sensor according to the embodiment of the present invention showing a shielded cable insertion part side thereof, and FIG. 8 is a schematic diagram for illustrating an attachment structure of the cable bushing of the sensor according to the embodiment of the present invention.

As shown in FIG. 1, a sensor 40 according to this embodiment is attached to a top surface of a track member 10 of a movement guide device 1. In order to ensure a stroke of a moving member 20, the sensor 40 according to this embodiment is preferably attached to one end of the track member 10 in the longitudinal direction. The sensor 40 according to this embodiment may be directly attached to the top surface of the track member 10 with a screw, adhesive or the like, or may be attached with an attachment member, for example.

Next, with reference to FIG. 2, the movement guide device 1 according to this embodiment will be described. The movement guide device 1 according to this embodiment includes the track member 10, which has a plurality of roller rolling faces 11 extending in the longitudinal direction formed on an outer surface thereof, and the moving member 20, which has a load roller rolling face 23 opposed to the roller rolling faces 11 formed thereon and is assembled onto the track member 10 with a plurality of rollers 30 interposed therebetween in such a manner that the moving member 20 can reciprocate on the track member 10.

A plurality of bolt holes 12 is formed in the track member 10 so as to extend from a top surface 13 thereof to a bottom surface 14 thereof. The movement guide device 1 according to this embodiment is fastened to an intended component, such as a base, by inserting bolts into the plurality of bolt holes 12 formed in the track member 10. The track member 10 is an elongated member having a generally rectangular cross section, and has a total of four roller rolling faces 11 formed symmetrically, two on each of the left and right sides.

The moving member 20 has a generally angled U-shaped cross section so that the moving member 20 straddles the top surface 13 and left and right side surfaces of the track member 10, and has a moving member main body 21, and a pair of side lids 22 attached to the opposite ends of the moving member main body 21 in the reciprocation direction.

The moving member main body 21 and the side lids 22 have a central part opposed to the top surface 13 of the track member 10 and a pair of leg parts opposed to the left and right side surfaces of the track member 10. On the moving member main body 21, for example, a total of four load roller rolling faces 23 extending in the longitudinal direction of the track member 10 are formed so as to be opposed to the roller rolling faces 11 of the track member 10.

In the moving member main body 21, furthermore, a total of four roller return paths 24 extending in parallel with the load roller rolling faces 23 are formed.

In the side lid 22, a direction changing path 25 having a U-shape is formed, and the direction changing path 25 connects one end of the load roller rolling face 23 and one end of the roller return path 24. A load roller rolling path formed by the roller rolling face 11 and the load roller rolling face 23, a pair of direction changing paths 25, and the roller return paths 24 form an endless circuit.

Since the rollers 30 are interposed between the roller rolling face 11 and the load roller rolling face 23, the movement guide device 1 allows the moving member 20 to move and roll in the longitudinal direction of the track member 10. A roller 30 having rolled to one end of the load roller rolling path is scooped up by a scoop part formed in the side lid 22 and guided to one direction changing path 25. The roller 30 is changed in travel direction by the direction changing path 25, rolls in the roller return path 24, and then returns to the load roller rolling path via the other direction changing path 25. In this way, the roller 30 rolls in an endless circuit.

The plurality of rollers 30 is preferably balls having a spherical shape. The plurality of rollers 30 is held by a band-shaped retainer 31, which is formed by spacers disposed between adjacent rollers 30 and a band-shaped coupling band disposed in the longitudinal direction and coupling the spacers to each other. The spacers disposed between the rollers 30 can prevent collision of the rollers 30. In addition, since the rollers 30 are coupled and held together by the band-shaped retainer 31, the rollers 30 can roll in line.

In the cross section of the movement guide device 1 in the width direction, the roller rolling face 11 and the load roller rolling face 23 are formed in a circular arc shape having the same curvature greater than the radius of curvature of the rollers 30. The shape of the roller rolling face 11 and the load roller rolling face 23 is not limited to the circular arc shape, but may be a Gothic arch shape, which is a combination of two circular arcs, or other curved shapes.

As shown in FIG. 3, the sensor 40 according to this embodiment includes a housing 50 that houses a sensor substrate 60, a shielded cable 61 connected to the sensor substrate 60, and a cable bushing 70 that is attached to one end of the shielded cable 61 and holds and secures the shielded cable 61 to the housing 50.

The housing 50 is formed by a separable body that can be divided into an upper case 51 and a lower case 52. The upper case 51 and the lower case 52 are preferably made of a metal such as an aluminum alloy, and an insulation treatment is applied to the upper case 51 and the lower case 52 excluding a conduction part 53 thereof described later.

As shown in FIG. 4, the upper case 51 has a cable bushing holding part 54 that has a generally semicircular cross section so as to conform to the outer circumferential shape of the cable bushing 70, and the cable bushing holding part 54 holds and secures the cable bushing 70 with the shielded cable 61 attached to one end thereof in a longitudinal direction L. A conduction part 53, which can be inserted into a conduction hole 71 formed in the cable bushing 70 described later, is formed on an inner circumferential surface of the cable bushing holding part 54. Furthermore, a flange engaging part 76, which is engaged with a flange part 75 of the cable bushing 70, is formed at one end of the cable bushing holding part 54 in the longitudinal direction L.

In the upper case 51, a sensor substrate housing part 55 that is in communication with the cable bushing holding part 54 is formed, and a filling hole 56 that is in communication with the sensor substrate housing part 55 is also formed. The upper case 51 further has an engaging claw 57 protruding from an abutment surface 58 that will come into contact with the lower case 52 when the upper case 51 and the lower case 52 are assembled together, and the engaging claw 58 is engaged with the lower case 52 when the upper case 51 and the lower case 52 are assembled together.

As shown in FIG. 5, in the lower case 52, a conduction part 53, a cable bushing holding part 54, a flange engaging part 76, and a sensor substrate housing part 55 corresponding to those of the upper case 51 are formed. In addition, as a component corresponding to the engaging claw 57 of the upper case 51, an engaging groove 59, which is engaged with the engaging claw 57, is formed. The engagement between the engaging claw 57 and the engaging groove 59 allows the upper case 51 and the lower case 52 to be aligned with each other when bonding the upper case 51 and the lower case 52 with a synthetic resin or the like.

Furthermore, in continuity with the sensor substrate housing part 55, a wire connection part housing part 80 that houses a wire connection part 64 of the sensor substrate 60 is formed at the opposite end to the end face in which the cable bushing holding part 54 is formed. Since the wire connection part housing part 80 is provided at the opposite end to the end face in which the cable bushing holding part 54 is formed, as shown in FIG. 3, the cable bushing holding part 54 subjected to a shield treatment and a wire connection part where there is a wire connection of the sensor substrate 60 can be isolated from each other, so that the structural insulation therebetween does not have to be considered, and the overall length of the housing 50 can be reduced. Furthermore, the housing 50 has secure holes 81 for fastening and securing to the track member 10 or an attachment member formed at four corners of the lower case 52.

As shown in FIG. 6 and FIG. 7, the cable bushing 70 is a cylindrical member made of an elastic material, such as rubber. The cable bushing 70 has a bushing end 77 and a flange part 75 formed at the opposite ends in the longitudinal direction, and a conductive treated part 78 formed between the bushing end 77 and the flange part 75, and the conductive treated part 78 has a smaller diameter than the bushing end 77 and the flange part 75.

The conductive treated part 78 has conduction holes 71 formed therein, into which the conduction parts 53 of the upper case 51 and the lower case 52 are inserted so that the conduction parts 53 can be electrically connected to a shield part 62 folded back onto the outer sheath of the shielded cable 61. Two conduction holes 71 are formed at two positions corresponding to the conduction parts 53 of the upper case 51 and the lower case 52.

A wall part 72 is formed on the end surface of the flange part 75, and a cable hole 73, into which a cable 63 of the shielded cable 61 can be inserted, is formed approximately at the center of the wall part 72. Since the wall part 72 is formed in this way, when the cable bushing 70 is attached to the shielded cable 61, the wall part 72 can insulate the shielded cable 61 from the housing 50 and the sensor substrate 60.

The bushing end 77 has a shielded cable insertion part 74 formed therein, into which the shielded cable 61 is inserted. The shielded cable 61 is inserted into the shielded cable insertion part 74 with the shield part 62 of the shielded cable 61 folded back onto the outer sheath of the shielded cable 61, so that the shield part 62 is exposed in the conduction hole 71 and can be electrically connected to the conduction parts 53.

With the sensor 40 according to this embodiment formed as described above, after the sensor substrate 60 is disposed in the lower case 52, and the cable 63 of the shielded cable 61 with the cable bushing 70 attached thereto is connected to the wire connection part 64 as shown in FIG. 3, the upper case 51 and the lower case 52 are engaged with each other as shown in FIG. 8, and bonded to each other by flowing a synthetic resin thereinto through the filling hole 56.

At this point, the shield part 62 is exposed in the conduction holes 71, and the housing 50 is formed by a separable body formed by the upper case 51 and the lower case 52. Therefore, the shield part 62 can be electrically connected to the upper case 51 and the lower case 52 by inserting the conduction parts 53 into the conduction holes 71, and the influence of noise due to a disturbance from above and below the sensor 40, that is, from the periphery of the sensor 40 can be reduced. In addition, since the housing 50 is formed by a separable body formed by the upper case 51 and the lower case 52, the sensor 40 can be easily assembled simply by assembling the upper case 51 and the lower case 52 to each other with the cable bushing 70 interposed therebetween and the conduction parts 53 inserted in the conduction holes 71.

In addition, since the wall part 72 is disposed between the sensor substrate 60 and the shielded cable 61, and the cable 63 is inserted alone into the cable hole 73 in the wall part 72 and connected to the sensor substrate 60, the insulation between the sensor substrate 60 and the shielded cable 61 can be achieved.

Furthermore, since the flange part 75 of the cable bushing 70 is engaged with the flange engaging parts 76 of the upper case 51 and the lower case 52, and the conduction parts 53 are inserted into the conduction holes 71, the shielded cable 61 and the cable bushing 70 can be prevented from coming out.

Furthermore, since the sensor 40 according to this embodiment is assembled as described above, bonding of the housing 50 and the water-proof treatment for the sensor substrate 60 and the wire connection part 64 can be achieved at the same time. Furthermore, since the electrical connection between the housing 50 and the shield part 62 is achieved by the conductive treated part 78, and the wall part 72 and the wire connection area are disposed at the opposite end to the cable bushing 70, the length of the housing 50 in the longitudinal direction can be reduced, and the sensor 40 can be downsized.

Although a case where a linear movement guide device is used as the movement guide device has been described in the above-described embodiment, the movement guide device is not limited to the linear movement guide device, but may be a ball screw device or a ball spline device, for example. Although the cable bushing 70 has been described as being attached to one end of the shielded cable 61 in the above description, the cable bushing 70 may be formed integrally with the shielded cable 61. It is obvious from the description of the claims that such modifications or improvements made to the embodiment can be included in the technical scope of the present invention.

REFERENCE NUMERALS

1 movement guide device
10 track member 20 moving member
40 sensor
50 housing
53 conduction part
56 filling hole
60 sensor substrate
61 shielded cable
70 cable bushing
71 conduction hole
72 wall part
L longitudinal direction

The invention claimed is:

1. A sensor that is attached to a movement guide device having a track member extending in a longitudinal direction and a moving member attached to the track member in such a manner that the moving member is movable in the longitudinal direction, comprising:
    a housing that houses a sensor substrate; a shielded cable connected to the sensor substrate; and a cable bushing that holds and secures the shielded cable to the housing,
    wherein the cable bushing has a conduction hole that allows the housing and the shielded cable to be electrically connected to each other, and
    the housing has a conduction part that can be inserted into the conduction hole.

2. The sensor according to claim 1, wherein at least two or more conduction holes are formed.

3. The sensor according to claim 1, wherein an end face of the cable bushing opposed to the sensor substrate is provided with a wall part having an insertion hole into which a wire in the shielded cable can be inserted.

4. The sensor according to claim 1, wherein the housing is formed by a separable body divided into at least two or more parts.

5. The sensor according to claim 1, wherein the housing has a filling hole formed therein that allows a sensor substrate housing part that houses the sensor substrate to be filled with a synthetic resin.

6. The sensor according to claim 1, wherein the housing is made of a metal, and at least a part of the housing excluding the conduction part is subjected to an insulation treatment.

7. The sensor according to claim 1, wherein a wire connection part where the shielded cable and the sensor substrate are connected by wire is formed at an end of the sensor substrate opposite to an end face of the sensor substrate opposed to the cable bushing.

8. A movement guide device, comprising the sensor according claim 1.

* * * * *